Oct. 3, 1950  R. R. KRUEGER  2,524,229

ANIMAL HUTCH

Filed Dec. 2, 1946

INVENTOR.
RAYMOND R. KRUEGER
BY
Bosworth & Sessions
ATTORNEYS

Patented Oct. 3, 1950

2,524,229

UNITED STATES PATENT OFFICE 2,524,229

ANIMAL HUTCH

Raymond R. Krueger, Mayfield Heights, Ohio

Application December 2, 1946, Serial No. 713,522

4 Claims. (Cl. 119—17)

This invention relates to hutches for keeping rabbits and other animals in which improved means are provided to remove the droppings of the animals therein.

Breeders raising rabbits and similar animals find it necessary to keep them apart and caged in separate compartments that combine to make a bank or group of hutches. In the case of rabbits several such hutches may be positioned one on top of the other in a group that stands against the wall of a building or the like. Several such groups may be positioned side by side. Each compartment or hutch of such a group or groups is relatively small, having a floor area of approximately ten or twelve square feet and a height of approximately two or two and a half feet. Each hutch is separated from the other by wire sides and a door is provided at the front to permit ready access to the animals within. The front and back of each compartment also is covered with wire.

In the use of such hutches it is necessary frequently to clean the manure from each of the compartments. This must be done with regularity in order to keep the animals healthy and the hutches sanitary. It has been customary to provide for cleaning by mounting a board at such an angle beneath a wire floor in the hutch as to permit the animal's droppings that fall through the wire to be deflected by the board to a space behind and below the compartment. Such manner of disposal is wasteful of space because it does not make it possible to position the bank of hutches flush with a wall of the building but requires space between the wall and the back of the hutches for cleaning purposes. Furthermore such a construction is difficult to keep clean and is undesirable from the standpoint of proper sanitation.

It is a general object of the present invention to provide an improved animal hutch structure that requires less space and is easier cleaned and more sanitary than those previously used. Another object of the invention is to provide a plurality of such hutches with a dropping pan for each hutch that discharges within the boundaries of the hutch side walls permitting the hutches to be stacked against the wall of a building. A further object of the invention is to provide a hutch employing a dropping pan that discharges adjacent its mid portion and that may readily be cleaned from the front. Still another object of the invention is to provide one or more groups of hutches in which each hutch of a group has a dropping pan that discharges into the one next below it and the bottom pan discharges into a central conduit for removal of the animal manure at one point.

Figure 1:
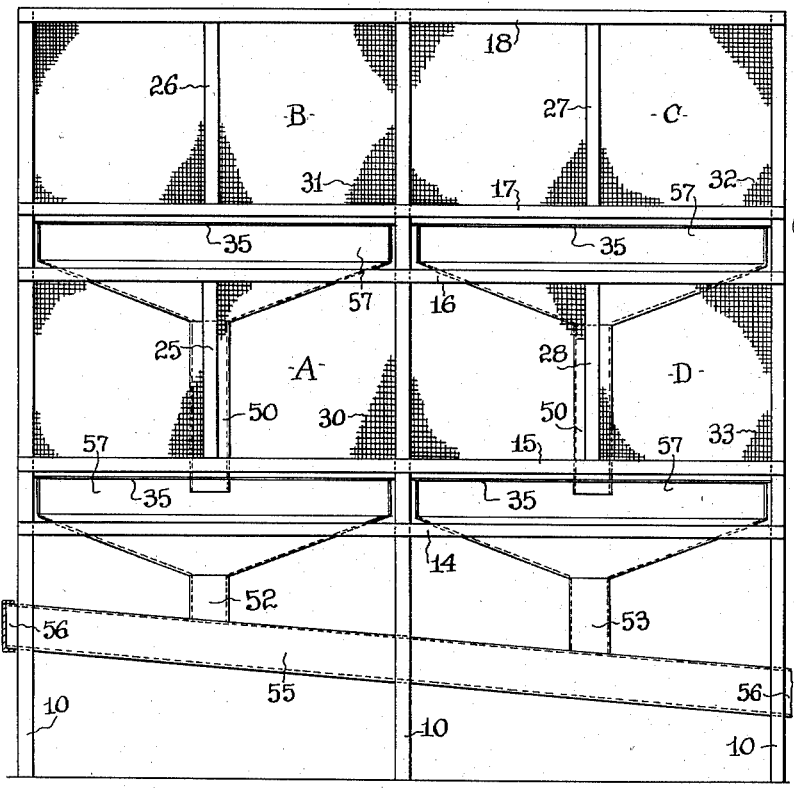
Figure 2:
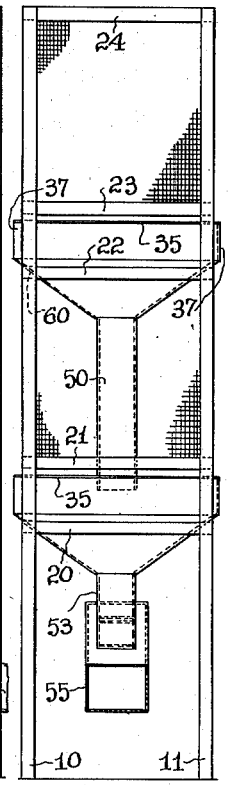
Figure 3:
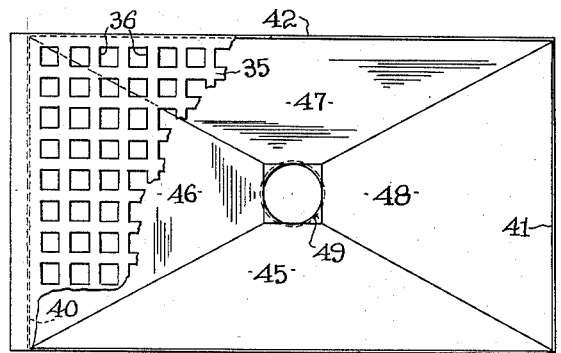
Figure 4:
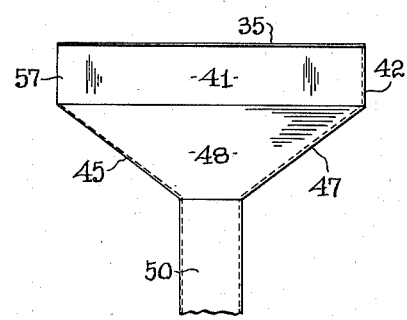
Figure 5:
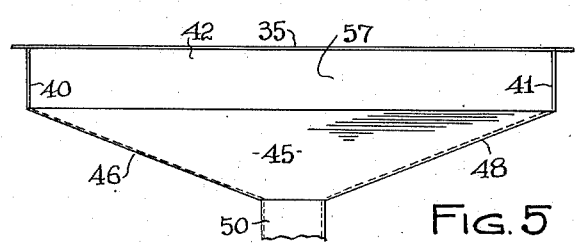

Other objects of the present invention will become apparent from the following description and from the accompanying drawings in which: Figure 1 is a front elevation of two groups of rabbit hutches side by side constructed in accordance with the present invention; Figure 2 is a side elevation of the hutches shown in Figure 1; Figure 3 is a plan view of a dropping pan forming part of the present invention and showing a portion of the screenlike flooring surmounting the pan, and; Figures 4 and 5 are side and front elevations respectively of a dropping pan.

In the form of the invention illustrated four individual compartments or hutches are shown. Two hutches are side by side on one level and the other two are mounted directly above them on the next level. It will be apparent that more or less individual compartments may be employed stacked in groups to any convenient height and placed in rows side by side to any extent desired. Since the invention may be described adequately by showing four such compartments no more are deemed necessary for purposes of illustration although it is to be understood that the invention may embody more or less individual compartments than are illustrated herein. Furthermore they may be grouped differently than illustrated in the drawings.

Referring now to Figures 1 and 2 the four compartments illustrated herein are supported on three front upright members 10 and three similar back members 11. The corner members 10 and 11 define the side, front and back walls of the groups and the center pair of members 10 and 11 define the walls between adjacent compartments. To tie the front upright members 10 together a plurality of horizontal members 14, 15, 16, 17 and 18 are provided. The members 15 and 16 and the members 17 and 18 define respectively the vertical extent of the front walls of the four compartments. Similar members preferably are provided at the rear of the unit to tie the upright members 11 together and in like manner define the back wall of each of the compartments.

The side or end walls of the compartments are defined by cross members 20, 21, 22, 23 and 24 that also serve to tie together the corresponding uprights 10 and 11. All of the members 10 and 11; 14, 15, 16, 17 and 18; and 20, 21, 22, 23 and 24 are fastened together in an appropriate manner to provide a unitary frame structure. The members may be made of wood and nailed together or of steel and welded or bolted together.

From the description thus far it will be seen that the lowermost pair of compartments of the two groups are defined at the front by horizontal members 15 and 16 and at each end by a respective pair of cross members 21 and 22. The back wall of each of the lower compartments may be defined by a second pair of horizontal members 15 and 16 in all respects like those at the front. In like manner the top two compartments are defined at the front and back by pairs of horizontal members 17 and 18 and at each end by respective pairs of end members 23 and 24. The four compartments so defined are indicated in Figure 1 as A, B, C and D. The compartments A and D and B and C are separated from each other by vertical walls defined by the center upright members 10 and 11.

To permit access to each compartment the front wall of each is divided by central upstanding members secured to the frame and indicated at 25, 26, 27 and 28 respectively. To the right of each member and swingably mounted on it is a door 30, 31, 32 or 33 by which access may be had to each of the compartments. Suitable latch means not shown are provided to keep each door closed.

The above description of the framework of my improved hutch is illustrative only of a preferred form of construction and it will be apparent that other forms of structural members and bracings may be employed herein without departing from the scope of the invention.

Fire screening is used to cover the sides, front, (including the doors) and back of the compartments A, B, C and D and also the top of the compartments B and C. Likewise such screening is provided to separate the compartments A and D and B and C. This screening may be standard one inch hexagonal poultry wire secured in any suitable manner to the frame members.

The floor of each of the compartments is made of a perforate member or screen as indicated at 35 in Figure 3 and preferably takes the form of individual relatively thin metal plates provided with a series of square openings 36 approximately five-eighths of an inch along each edge. These plates form the flooring on which the animals in the compartments move and the perforations readily permit the animals' droppings to fall through and to this extent render each compartment self cleaning. Other forms of perforated flooring may be employed with the present invention although the type described above is preferable for most uses, particularly in the raising of rabbits. A separate plate 35 is provided as indicated in Figure 3 as the flooring of each of the compartments.

A sheet metal dropping pan is provided beneath each compartment and takes the form shown in Figures 3, 4 and 5. As best shown in Figure 2 the pan is somewhat wider than the compartment above it and protrudes at the front and back beyond the upright members 10 and 11 and the screening carried by them as there shown at 37. This is to insure that none of the animal's droppings will fail to fall into the pan beneath the compartment. Each pan is made as wide as possible while still permitting it to be positioned as hereafter described. Sheet metal plates 39 line the inside of all the walls of each compartment to a height about three inches above the floor to, in effect, form extensions of the pan sides hereafter described to insure catching all the droppings.

The dropping pans are all alike in shape, and also in size assuming that the floor area of each compartment is the same, and each comprises a generally funnel shaped sheet metal container of rectangular shape. Two vertical sheet metal side walls 40 and 41 are connected by a sheet metal back wall 42. No front wall is provided for reasons that will hereafter be explained. The side and back walls merge with walls 45, 46, 47 and 48 all sloping downwardly and inwardly to terminate at a rectangular bottom plate 49 that is pierced to provide an aperture that receives a round tubular discharge pipe 50. The sheets forming the generally rectangular funnel shaped dropping pan just described are soldered or welded together along adjacent edges to provide the unitary construction shown in the drawings. Each dropping pan normally supports a floor plate 35 forming the bottom of the compartment immediately above.

The discharge pipes 50 of the pans immediately beneath the compartments B and C pass through compartments A and D respectively and discharge into the pans associated with these lower compartments. The mid portion of each of the floor plates 35 associated with the compartments A and D is centrally pierced to permit the pipes 50 of the upper dropping pans to pass through them into the lower pans as shown in Figure 1. In the same manner each of the compartments A and D is partially taken up by the centrally disposed conduit 50 of the dropping pan above.

The conduits 50 from the lower dropping pans as indicated at 52 and 53 discharge into an angularly disposed sheet metal pipe 55 of rectangular cross section. The lower end of the pipe indicated at 56 may discharge through a suitable connection into a sewer. The upper end 56 of the pipe 55 may be provided with a removable cap to permit insertion of a hose to flush out the interior.

As described above no front wall is provided for the dropping pans and consequently that portion of the pan directly opposite the back wall 42 is open as indicated at 57 (Figure 4). This is to permit insertion of a hose or other cleaning means to wash down each dropping pan and thus permit the entire disposal system to be cleaned readily.

The dropping pans are generally mounted permanently within the frame unit but may be made removable if desired. The dimensions of each pan are such that it fits closely within a region bounded by horizontal members 14 and 15 or 16 and 17 at the front and back and by cross members 20 and 21 or 22 and 23 at the sides. The front and back horizontal members 14 and 16 are formed on their inner top edges as at 60 to permit the dropping pans to fit more firmly against them than would be possible if the pan portions 45 and 47 engaged only the inner top edges of the horizontal members.

It will be apparent from the foregoing description that I have described herein only one form of my invention and that various changes and modifications may be made therein without departing from its scope and that I intend to be limited in such scope only by the appended claims.

I claim:

1. A compartment for housing rabbits and similar animals comprising means forming an enclosure, said enclosure having a floor taking the form of a perforate member the perforations of which are of a size to permit droppings to pass readily therethrough; a pan-like element beneath said floor and substantially coextensive with it, the sides thereof sloping downward toward an aperture within the limits of the pan-like element at an angle such as to cause the droppings to travel toward the aperture; a tubular discharge conduit surrounding the aperture in the pan-like element through which conduit the droppings fall to a lower level; and, at the bottom of the discharge conduit, means receiving the droppings as they fall through the discharge conduit.

2. A compartment as in claim 1 in which the sides of the pan-like element have vertical portions which intervene between the perforate member and the sloping portions of the pan-like element.

3. A compartment as in claim 2 in which the vertical portions intervening between the perforate member and the sloping portions of the pan-like element comprise two vertical side walls connected by a vertical back wall.

4. A compartment as in claim 3 in which the means receiving the droppings take the form of an angularly disposed chute deflecting the droppings to one side.

RAYMOND R. KRUEGER.

REFERENCES CITED

The following references are of record in the file of this patent:

UNITED STATES PATENTS

| Number | Name | Date |
| --- | --- | --- |
| 351,729 | Wells | Oct. 26, 1886 |
| 878,696 | Weekley | Feb. 11, 1908 |
| 1,416,022 | Hartley | May 16, 1922 |
| 1,416,531 | Ullom | May 16, 1922 |
| 1,813,847 | Gorsuch | July 7, 1931 |
| 1,840,202 | Kerr | Jan. 5, 1932 |
| 2,144,329 | Conlon et al. | Jan. 17, 1939 |
| 2,339,043 | Armstrong | Jan. 11, 1944 |
| 2,383,326 | Lovell | Aug. 21, 1945 |
| 2,388,157 | Kerr | Oct. 30, 1945 |